United States Patent
Wang

(10) Patent No.: US 9,484,754 B2
(45) Date of Patent: Nov. 1, 2016

(54) BALANCING SERIES-CONNECTED ELECTRICAL ENERGY UNITS

(71) Applicant: Balanstring Technology, LLC, Katy, TX (US)

(72) Inventor: Wenwei Wang, Katy, TX (US)

(*) Notice: Subject to any disclaimer, the term of this patent is extended or adjusted under 35 U.S.C. 154(b) by 0 days.

(21) Appl. No.: 14/911,342

(22) PCT Filed: Jul. 15, 2015

(86) PCT No.: PCT/US2015/040512
§ 371 (c)(1),
(2) Date: Feb. 10, 2016

(87) PCT Pub. No.: WO2016/011119
PCT Pub. Date: Jan. 21, 2016

(65) Prior Publication Data
US 2016/0204627 A1    Jul. 14, 2016

Related U.S. Application Data

(60) Provisional application No. 62/025,492, filed on Jul. 17, 2014.

(51) Int. Cl.
*H02J 7/00* (2006.01)
(52) U.S. Cl.
CPC ............ *H02J 7/0016* (2013.01); *H02J 7/0019* (2013.01); *Y02T 10/7055* (2013.01)
(58) Field of Classification Search
CPC .................................................. H02J 7/0016
USPC ........................................................ 320/118
See application file for complete search history.

(56) References Cited

U.S. PATENT DOCUMENTS

| | | | | |
|---|---|---|---|---|
| 3,244,960 A | * | 4/1966 | Stevens | H02M 7/068 336/208 |
| 5,594,320 A | * | 1/1997 | Pacholok | H02J 7/0018 320/103 |
| 5,726,551 A | | 3/1998 | Miyazaki et al. | |
| 6,373,223 B1 | * | 4/2002 | Anzawa | H02J 7/0018 320/116 |
| 6,873,134 B2 | * | 3/2005 | Canter | H02J 7/0021 320/118 |

(Continued)

*Primary Examiner* — Samuel Berhanu
*Assistant Examiner* — Tessema Kebede
(74) *Attorney, Agent, or Firm* — Kevin Roe

(57) ABSTRACT

An apparatus and methods to fabricate the apparatus for balancing a string of N series-connected electrical energy units (such as battery cells or modules) comprising: a transformer with a magnetic core and N windings; N switch circuits; N driver circuits, each driver circuit operable to turn ON/OFF a respective switch circuit in a charging or discharging or idling configuration; and a controller circuit. In a novel way, the controller circuit selects each electrical energy unit for charging or discharging or idling, and controls simultaneously coupling all selected-for-discharging electrical energy unit(s) to respective winding(s) in discharging configuration(s) for a first period of time to simultaneously energize the respective winding(s); then immediately or after a short delay, the controller circuit controls simultaneously coupling all selected-for-charging electrical energy unit(s) to respective winding(s) in charging configuration(s) for a second period of time to be charged with respective induced current(s).

18 Claims, 11 Drawing Sheets

(56) References Cited

U.S. PATENT DOCUMENTS

| | | | |
|---|---|---|---|
| 8,183,870 B1* | 5/2012 | Davies | H01M 10/4207 320/118 |
| 8,217,623 B2* | 7/2012 | Oh | H02J 7/0016 320/118 |
| 2008/0191663 A1* | 8/2008 | Fowler | B60L 11/185 320/118 |
| 2013/0009674 A1* | 1/2013 | Reese | H03K 3/0315 327/109 |
| 2013/0076309 A1 | 3/2013 | Nork et al. | |
| 2013/0124122 A1* | 5/2013 | Cook | H02S 50/10 702/64 |
| 2014/0015488 A1 | 1/2014 | Despesse | |
| 2014/0354212 A1* | 12/2014 | Sugeno | H01M 10/441 320/103 |

* cited by examiner

BALANCING SERIES-CONNECTED ELECTRICAL ENERGY UNITS

TECHNICAL FIELD

The present invention relates in general to balancing charge within a string of series-connected electrical energy units. And more particularly, the present invention relates to an apparatus and methods for balancing a battery string or a super-capacitor string or a string of equivalent electrical energy units.

BACKGROUND ART

An electrical energy unit referred to in the present invention is usually rechargeable and has a direct-current (DC) voltage. And an electrical energy unit may further comprise one or more sub-units; and the sub-units may be connected in series or in parallel or in any combination thereof to form the electrical energy unit. For instance, an electrical energy unit can be one battery cell, or it can be a battery module comprising a plurality of battery cells which are connected in series or in parallel or in any combination thereof to form the battery module.

Re-charging a string of series-connected electrical energy units involves adding charge to the entire string; while balancing the string involves redistributing charge among some electrical energy units within the string, but not adding any external charge to the string. As a technical terminology, "charge balancing" is sometimes interchangeably referred to as "charge equalization" or "charge redistribution" or simply "balancing". A good example is balancing a lithium-ion battery string/pack for an electric car or a hybrid car, because mismatches in voltages, state-of-charge (SOC), capacities, internal impedances, and so forth among battery cells tend to increase over usage, over temperature, and over time. Battery balancing is one of the key functions of a battery management system (BMS). And a battery balancer is a dedicated device that can perform the task of battery balancing.

There are two basic categories of balancing technology, i.e., dissipative balancing and non-dissipative balancing. Dissipative balancing is sometimes referred to as passive balancing. Dissipative balancing cannot transfer charge among electrical energy units, but dissipates and therefore wastes excessive charge as undesirable heat usually when a string is being re-charged. Non-dissipative balancing is sometimes referred to as active balancing. Since the present invention is a novel, high-efficiency, and low-cost non-dissipative balancing technology based on one transformer, the following discussions are focused on several prior art methods, each of which performs non-dissipative balancing based on one transformer.

U.S. Pat. No. 8,598,844 (Densham et al.) discloses a method of balancing a plurality of battery cells, each of which is coupled to one of a plurality of secondary windings of a transformer during re-charging; however, the method cannot balance cells when the battery pack is discharging. U.S. Pat. No. 8,310,204 (Lee et al.) discloses a method of balancing one cell to the rest of a battery pack via a fly-back transformer; however, this method does not allow transferring charge from the pack to a cell, and does not allow transferring charge from a cell to other specific cell(s).

U.S. Pat. No. 7,400,114 (Anzawa et al.) discloses a method of balancing a battery string by utilizing a shared transformer with a plurality of pairs of primary and secondary windings corresponding to a plurality of battery cells; all the primary windings are switched on and off simultaneously then charge battery cell(s) with lower voltage(s) via secondary windings. However, the efficiency is low because every cell will be discharged then charged, even though the cell(s) with higher voltages will be discharged more and the cell(s) with lower voltage(s) will be charged more. And there will be considerable charge energy dissipated as heat via all the rectifier diodes, all the windings, and other components. And the method does not allow selection of transferring charge from some specific cell(s) to other specific cell(s).

U.S. Pat. No. 5,821,729 (Schmidt et al.) and U.S. Pat. No. 8,269,455 (Marten) disclose similar methods, each of which is for balancing a battery string by utilizing a shared transformer with a plurality of windings corresponding to a plurality of battery cells. Each winding can be driven bi-directionally via a full-bridge or a half-bridge configuration. And all the windings are energized simultaneously so that charge from cell(s) with higher voltages may be transferred to cell(s) with lower voltages in a forward-converter manner. These methods do not allow selection of transferring charge from some specific cell(s) to other specific cell(s). And voltage differentials among battery cells may be insignificant (for instance, the middle portions of discharge curves of some lithium-ion battery cells are very flat making it impractical to generate sufficient voltage differentials among battery cells), therefore making these methods impractical for most real world applications. And non-dissipative balancing that involves all the electrical energy units is inefficient because of various unnecessary energy losses resulting from charging and/or discharging multiple electrical energy units which are already approximately balanced.

The most common method of balancing series-connected super-capacitors (also known as ultra-capacitors) uses bleeding resistor(s) because of ease of implementation and low cost. U.S. Pat. No. 8,198,870 (Zuercher) discloses such a method; however, the method is essentially a passive/dissipative balancing method and cannot move extra charge to where it is needed.

SUMMARY OF INVENTION

Technical Problem

The most efficient way to balance a string of electrical energy units is to simultaneously and directly (not via the entire string, not via one section of the string, and not via one adjacent electrical energy unit) transfer charge from any one or any plurality of electrical energy units to another one or another plurality of electrical energy units. However, there is no prior-art balancing method which is based on one transformer, and which allows selection of simultaneously transferring charge from any one or any plurality of electrical energy units to another one or another plurality of electrical energy units via the transformer.

And there is no prior-art non-dissipative/active balancing method which is both efficient and economical for balancing a long string of electrical energy units (for example, it is common for the battery pack of an electric car or a hybrid car to be consisted of 100 or more series-connected battery cells). Usually a long string is split into a plurality of modules, and each prior-art balancer can only balance a module; however, any charge imbalance among the modules is not addressed.

Solution to Problem

In one embodiment of the present invention, an apparatus for balancing a string of N (where N>2) series-connected electrical energy units, the apparatus comprising: a transformer, the transformer including a magnetic core and N windings corresponding to the N electrical energy units; N switch circuits corresponding to the N electrical energy units, each switch circuit including a plurality of electronic switches operable to couple a respective electrical energy unit to a respective winding in a discharging configuration, or to couple the respective electrical energy unit to the respective winding in a charging configuration, or to uncouple the respective electrical energy unit from the respective winding in an idling configuration; N driver circuits, being respectively coupled to the N switch circuits, each driver circuit being operable to turn ON/OFF electronic switches of a respective switch circuit; and a controller circuit, being coupled to the N driver circuits, and operable to select each electrical energy unit for charging or discharging or idling, and operable to control simultaneously coupling all selected-for-discharging electrical energy unit(s) to respective winding(s) in discharging configuration(s) for a first period of time to simultaneously energize the respective winding(s), then immediately or after a short delay, operable to control simultaneously coupling all selected-for-charging electrical energy unit(s) to respective winding(s) in charging configuration(s) for a second period of time to be charged with respective induced current(s).

Compared with all prior-art, the novelties of the present invention as described in the above embodiment are based on the combination of the following: balancing based on one transformer; allowing selection of transferring charge from any one or any plurality of electrical energy units to another one or another plurality of electrical energy units via the transformer; the capability to simultaneously energize a plurality of windings (not all the N windings) for a period of time and then release stored energy through another one or another plurality of windings in another period of time.

In another embodiment of the present invention, an apparatus for balancing a string of N (where N>2) series-connected electrical energy units, the apparatus comprising: a transformer, the transformer including a magnetic core, and N charging windings corresponding to the N electrical energy units, and N discharging windings corresponding to the N electrical energy units; N switch circuits corresponding to the N electrical energy units, each switch circuit including a plurality of electronic switches operable to couple a respective electrical energy unit to a respective discharging winding in a discharging configuration, or to couple the respective electrical energy unit to a respective charging winding in a charging configuration, or to uncouple the respective electrical energy unit from the respective discharging winding and the respective charging winding in an idling configuration; N driver circuits, being respectively coupled to the N switch circuits, each driver circuit being operable to turn ON/OFF electronic switches of a respective switch circuit; and a controller circuit, being coupled to the N driver circuits, and operable to select each electrical energy unit for charging or discharging or idling, and operable to control simultaneously couple all selected-for-discharging electrical energy unit(s) to respective discharging winding(s) in discharging configuration(s) for a first period of time to simultaneously energize the respective discharging winding(s), then immediately or after a short delay, operable to control simultaneously coupling all selected-for-charging electrical energy unit(s) to respective charging winding(s) in charging configuration(s) for a second period of time to be charged with respective induced current(s).

Compared with all prior-art, the novelties of the present invention as described in the above embodiment are based on the combination of the following: balancing based on one transformer; allowing selection of transferring charge from any one or any plurality of electrical energy units to another one or another plurality of electrical energy units via the transformer; the capability to simultaneously energize a plurality of discharging windings (not all the N discharging windings) for a period of time and then release stored energy through one or a plurality of charging windings in another period of time.

Several battery balancer prototypes had successfully been developed by the inventor based on the present invention. Both high balancing efficiency and low cost had been achieved. And all major features of the present invention had been verified to be fully functional and be practical for commercialization.

Advantageous Effects of Invention

It is an advantageous effect of the present invention to achieve an apparatus and related methods for balancing a string of series-connected electrical energy units; where the apparatus can bi-directionally move charge between any one or any plurality of electrical energy units and another one or another plurality of electrical energy units within the string simultaneously and directly via a shared transformer, so that balancing time can substantially be shortened and energy loss can substantially be reduced, thereby substantially improving overall balancing efficiency and performance.

Another advantageous effect of the present invention is a capability to not only balance a short string, but also balance a long string of series-connected electrical energy units using one shared transformer, without the need to split the long string into a plurality of modules and then to balance each module.

Another advantageous effect of the present invention is the low cost to build such a balancing apparatus by using one shared transformer, and by using low-voltage and low-cost switch circuits, and by using low-cost switch driver circuits, and by using a low-power-consumption and low-cost controller circuit.

Other advantages and benefits of the present invention will become readily apparent upon further review of the following drawings.

BRIEF DESCRIPTION OF THE DRAWINGS

For a more complete understanding of the present invention, reference is now made to the following descriptions taken in conjunction with the accompanying drawings.

MODES FOR CARRYING OUT THE INVENTION

Figure 1:
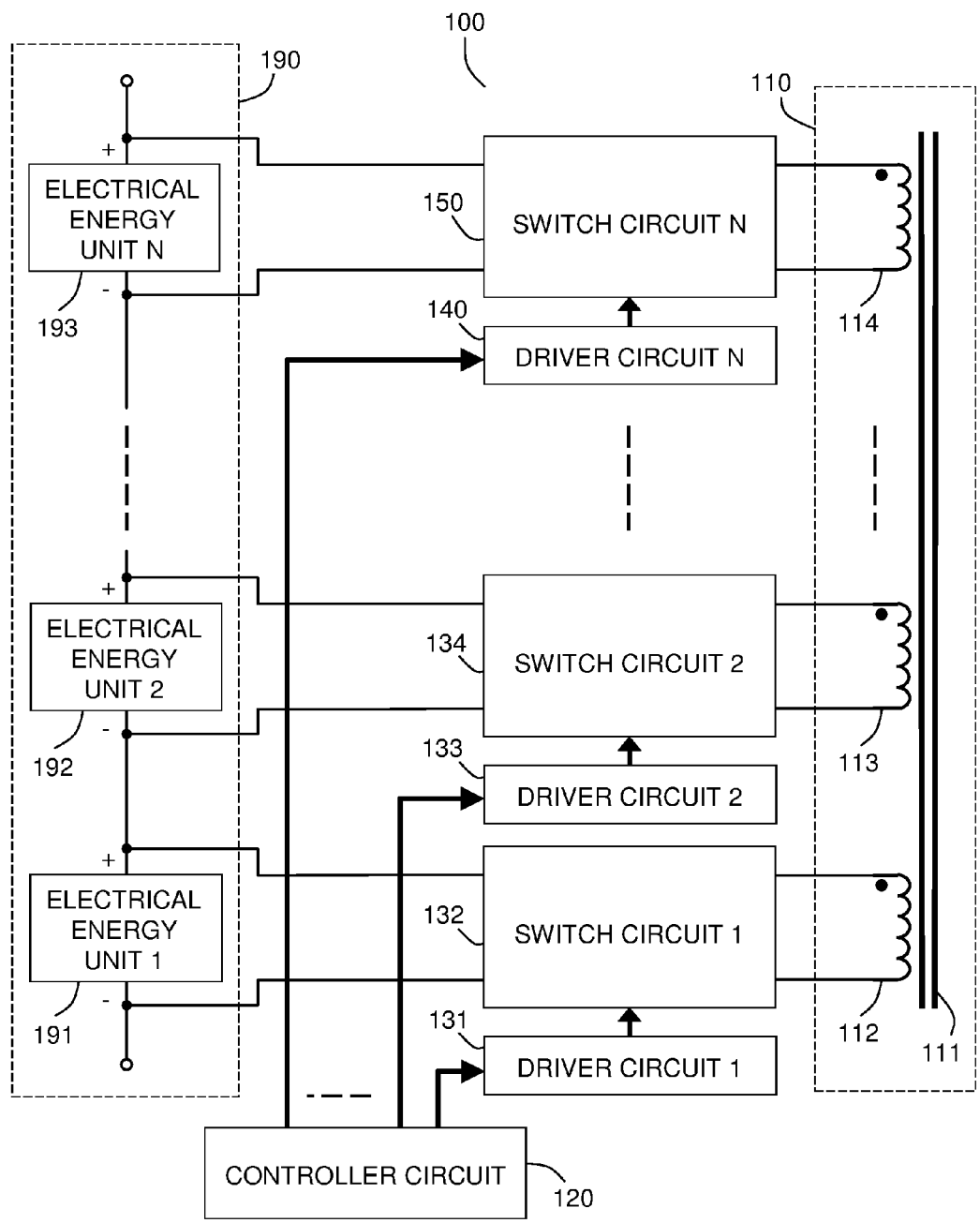
FIG. 1 is a block diagram illustrating the basic structure of an apparatus for balancing N series-connected electrical energy units coupled to N respective windings of a transformer, in accordance with a first embodiment of the present invention.

In a first embodiment of the present invention, as illustrated in FIG. 1, an apparatus 100 for balancing a string 190 of N (where N>2) series-connected electrical energy units (including a first electrical energy unit 191, a second electrical energy unit 192, . . . , and an N-th electrical energy unit 193), the apparatus 100 comprising: a transformer 110, the transformer 110 including a magnetic core 111 and N windings (including a first winding 112, a second winding 113, . . . , and an N-th winding 114) corresponding to the N electrical energy units; N switch circuits (including a first switch circuit 132, a second switch circuit 134, . . . , and an N-th switch circuit 150) corresponding to the N electrical energy units, each switch circuit including a plurality of electronic switches operable to couple a respective electrical energy unit to a respective winding in a discharging configuration, or to couple the respective electrical energy unit to the respective winding in a charging configuration, or to uncouple the respective electrical energy unit from the respective winding in an idling configuration; N driver circuits (including a first driver circuit 131, a second driver circuit 133, . . . , and an N-th driver circuit 140), being respectively coupled to the N switch circuits, each driver circuit being operable to turn ON/OFF electronic switches of a respective switch circuit; and a controller circuit 120, being coupled to the N driver circuits, and operable to select each electrical energy unit for charging or discharging or idling, and operable to control simultaneously coupling all selected-for-discharging electrical energy unit(s) to respective winding(s) in discharging configuration(s) for a first period of time (adjustable) to simultaneously energize the respective winding(s), then immediately or after a short delay (adjustable), operable to control simultaneously coupling all selected-for-charging electrical energy unit(s) to respective winding(s) in charging configuration(s) for a second period of time (adjustable) to be charged with respective induced current(s).

If an electrical energy unit is selected for discharging, the electrical energy unit is discharged by being coupling to a respective winding and energizing the respective winding; if the electrical energy unit is selected for charging, the electrical energy unit is coupled to the respective winding to be charged with an induced current from the respective winding; if the electrical energy unit is selected for idling, the electrical energy unit remains uncoupled from the respective winding, and is neither discharged nor charged before the next selection. Idling is the default state of each electrical energy unit when there is no ongoing balancing or when a respective driver circuit is powered down. Charge can be transferred bi-directionally between any one or any plurality of electrical energy units and another one or another plurality of electrical energy units within the string 190. For instance, charge can be transferred from one or a plurality of electrical energy units with higher voltages to another one or another plurality of electrical energy units with lower voltages; or charge can be transferred from one or a plurality of electrical energy units with higher SOC to another one or another plurality of electrical energy units with lower SOC. And sometimes, because a higher SOC may not necessarily be associated with a higher voltage, charge can also be transferred from one or a plurality of electrical energy units with lower voltages but higher SOC to another one or another plurality of electrical energy units with higher voltages but lower SOC.

Still referring to the first embodiment, the way that one or a plurality of windings are simultaneously energized and then stored energy (as flux in the magnetic core 111) is released as induced current(s) via another one or another plurality of windings is to some extent analogous to how a flyback converter works. Please note that even though so far, every built battery balancer prototype works in a way to some extent analogous to how a flyback converter works in discontinuous current mode (i.e., energizing current(s) increase from zero to peak(s) when storing energy, then induced current(s) decrease from peak(s) to zero when releasing stored energy), with appropriate sensors and closed-loop controls accompanied by substantially increased complexity and cost, a balancing apparatus based on the present invention may also be constructed working in a way to some extent analogous to how a flyback converter works in continuous current mode (i.e., energizing current(s) increase from non-zero to peak(s) when storing energy, then induced current(s) decrease from peak(s) to non-zero when releasing stored energy).

To summarize, compared with all prior-art, the novelties of the present invention as described in the first embodiment are based on the combination of the following: balancing based on one transformer; allowing selection of transferring charge from any one or any plurality of electrical energy units to another one or another plurality of electrical energy units via the transformer; the capability to simultaneously energize a plurality of windings (not all the N windings) for a period of time and then release stored energy through another one or another plurality of windings in another period of time.

The following discloses how simultaneously energizing a plurality of windings of a transformer actually functions. In real world applications, it is very rare that a transformer contains a plurality of primary windings and that all the primary windings are simultaneously energized. And conventional transformer theory may misinterpret the functioning as being equivalent to parallel-loading (or adding-up or multiplying). In reality, the functioning is based on a special transformer electromagnetic property which was discovered during development and testing of battery balancer prototypes. Based on the first embodiment of the present invention as illustrated in FIG. 1, the special transformer electromagnetic property is stated as follows: assuming each winding has an identical number of turns, and assuming the nominal voltage of each electrical energy unit is $V_{CELL}$, and assuming the self-inductance of each winding is L, and assuming the number of selected-for-discharging electrical energy units is X, when X respective windings are simultaneously energized, the effective self-inductance of each energized winding does not remain as L, but is increased to XL. For instance, if X is 2, the effective self-inductance of each energized winding becomes 2L; and if X is 15, the effective self-inductance of each energized winding becomes 15L; and so forth. Consequently, if the X respective windings are energized for a period of time T (before the magnetic core 111 is saturated), the corresponding peak current $I_{PEAK}$ of each winding can be expressed by the following equation 1:

$$I_{PEAK} = \frac{V_{cell}T}{XL} \quad (1)$$

Figure 2:
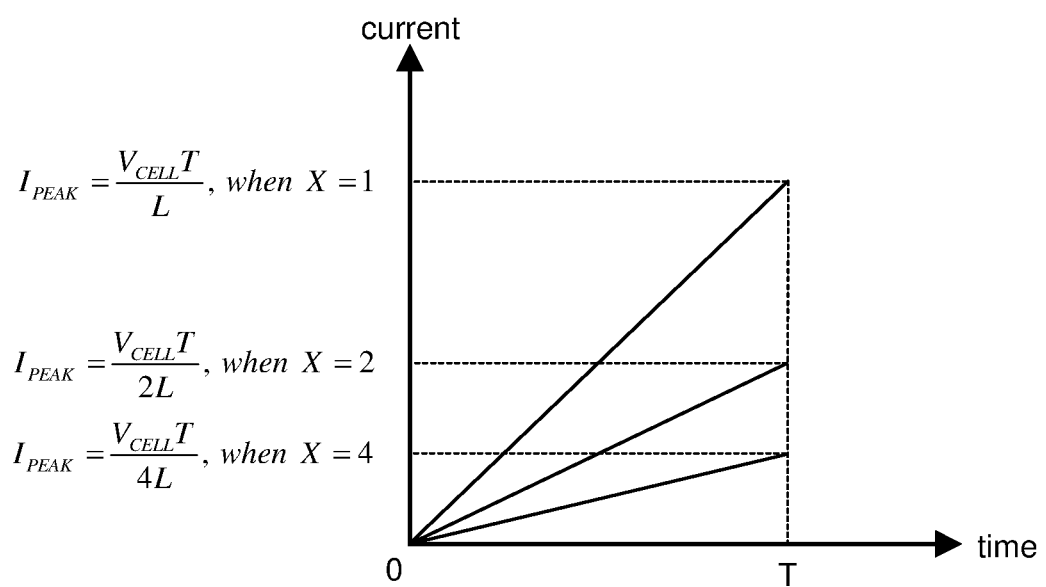
FIG. 2 illustrates proportional changes in current waveforms and estimated peak currents when the number of simultaneously energized windings is increased from 1 to 2 then to 4, in accordance with a special transformer electromagnetic property.

FIG. 2 illustrates that, because of this special transformer electromagnetic property, the peak current $I_{PEAK}$ decreases proportionally as X is increased from 1 to 2 and then to 4. When only 1 winding is energized for a period of T, the stored energy $E_1$ in the magnetic core 111 can be expressed by the following equation 2:

$$E_1 = \frac{(V_{CELL}T)^2}{2L} \quad (2)$$

And when 2 windings are simultaneously energized for a period of T, the total stored energy $E_2$ in the magnetic core 111 is not doubled based on parallel-loading, but surprisingly remains the same as $E_1$, as is shown in the following equation 3:

$$E_2 = \frac{(V_{CELL}T)^2}{2(2L)} + \frac{(V_{CELL}T)^2}{2(2L)} = \frac{(V_{CELL}T)^2}{2L} = E_1 \quad (3)$$

And in general, when X windings are simultaneously energized for a period of T, the total stored energy $E_X$ in the magnetic core 111 is not X-fold-increased based on parallel-loading, but remains the same as $E_1$, and is shown in the following equation 4:

$$E_X = \frac{(V_{CELL}T)^2}{2(XL)} + \ldots + \frac{(V_{CELL}T)^2}{2(XL)} = \frac{(V_{CELL}T)^2}{2L} = E_1 \quad (4)$$

Being able to reasonably accurately estimate a peak current when a plurality of windings are simultaneously energized is crucial to the present invention, because this enables a reasonably accurate estimate of energy transferred during balancing.

If $I_{PEAK}$ is pre-determined based on a specific balancing apparatus design, T can be calculated by the following equation 5 which is derived from equation 1:

$$T = \frac{I_{PEAK} XL}{V_{CELL}} \quad (5)$$

And referring to the first embodiment of the invention, assuming that the apparatus 100 works in a way to some extent analogous to how a flyback converter works in discontinuous current mode, based on the above equation 5, the first period of time and the second period of time can be estimated. For instance, assuming $I_{PEAK}$ is designed to be 2 amperes, and L is 5 microhenries, and $V_{CELL}$ is 3.3 volts, and assuming the magnetic core 111 is not saturated, when X=1, the first period of time and the second period of time are approximately 3 microseconds; when X=10, the first period of time and the second period of time are increased to approximately 30 microseconds; and when X=50, the first period of time and the second period of time are increased to approximately 150 microseconds; and so forth. Please note that when T increases, the frequency of driving signals from corresponding driver circuits is decreased proportionally, advantageously resulting in reduced switching loss, reduced magnetic core heat loss, reduced electromagnetic interference (EMI), and reduced percentage of energy stored in leakage inductance of windings.

In one embodiment, each electrical energy unit is selected from one of the following units including: a battery cell; a super-capacitor cell; a battery module comprising a plurality of battery cells connected in series or in parallel or in any combination thereof; a super-capacitor module comprising a plurality of super-capacitor cells connected in series or in parallel or in any combination thereof; some other form of electrical energy cell; some other form of electrical energy module.

In another embodiment, the ratio of a nominal voltage of an electrical energy unit over the number of turns of a respective winding is identical for all the N electrical energy units. And in one embodiment, all the N electrical energy units are preferably adapted to be nominally identical or equivalent (such as identical nominal voltages, identical nominal capacities, and so forth).

In one embodiment, each electronic switch of each switch circuit is a transistor (such as a field-effect-transistor (FET) or a bipolar-junction-transistor (BJT) or an equivalent transistor) or a diode or an equivalent device.

Figure 3:
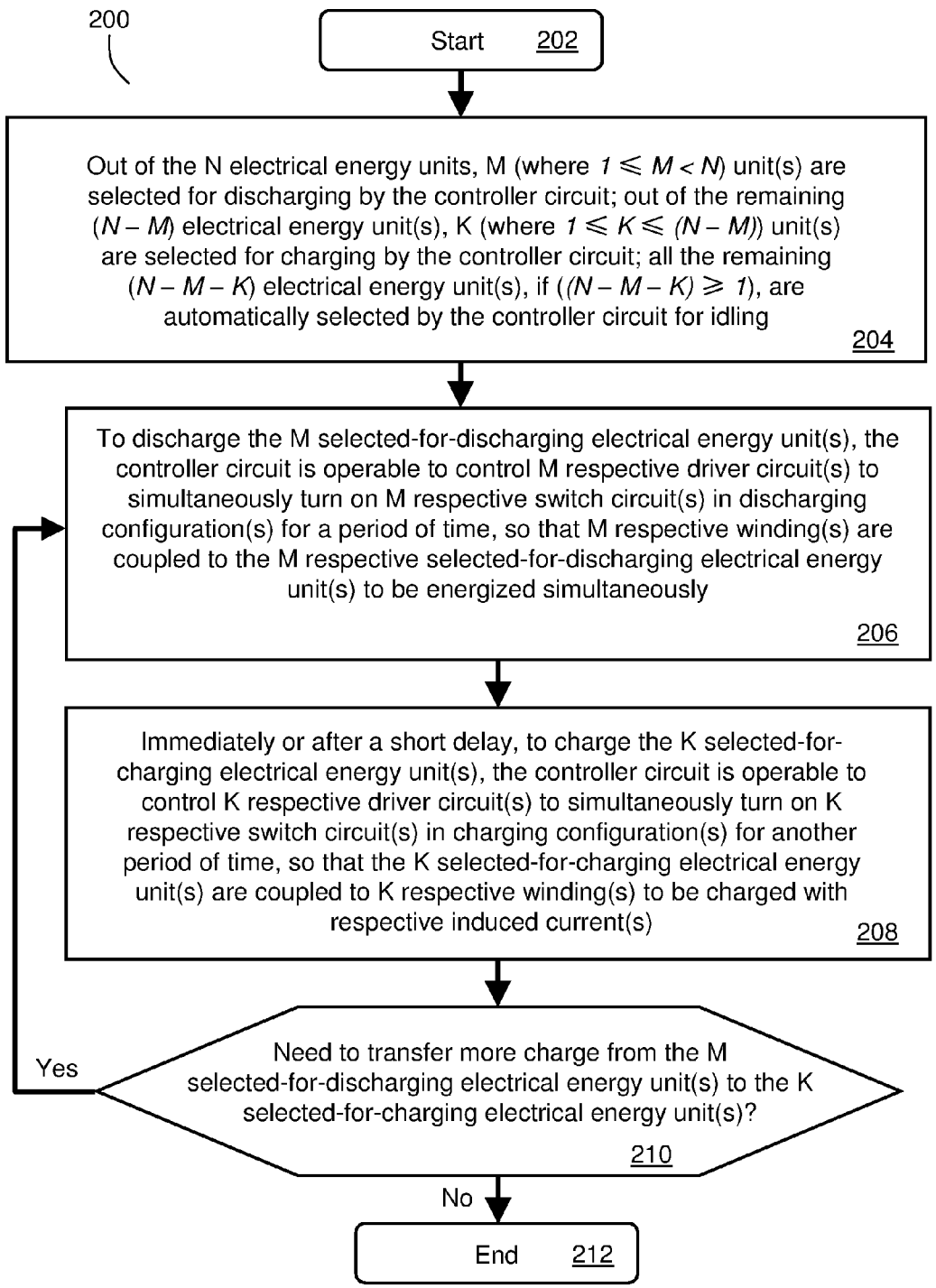
FIG. 3 illustrates a step-by-step balancing process that can be executed by the apparatus, in accordance with the first embodiment of the present invention.

FIG. 3 illustrates a step-by-step balancing process 200 that can be executed by the apparatus 100. The balancing process 200 starts at step 202. Step 204 is next, where out of the N electrical energy units, M (where 1≤M<N) unit(s) are selected for discharging by the controller circuit 120; out of the remaining (N−M) electrical energy unit(s), K (where 1≤K≤(N−M)) unit(s) are selected for charging by the controller circuit 120; all the remaining (N−M−K) electrical energy unit(s), if ((N−M−K)≥1), are selected by the controller circuit 120 for idling. Then step 206 is next, where to discharge the M selected-for-discharging electrical energy unit(s), the controller circuit 120 is operable to control M respective driver circuit(s) to simultaneously turn on M respective switch circuit(s) in discharging configuration(s) for a period of time, so that M respective winding(s) are coupled to the M respective selected-for-discharging electrical energy unit(s) to be energized simultaneously. Then step 208 is next, where immediately or after a short delay, to charge the K selected-for-charging electrical energy unit(s), the controller circuit 120 is operable to control K respective driver circuit(s) to simultaneously turn on K respective switch circuit(s) in charging configuration(s) for another period of time, so that the K selected-for-charging electrical energy unit(s) are coupled to K respective winding(s) to be charged with respective induced current(s). Then step 210 is next, where if more charge needs to be transferred from the M selected-for-discharging electrical energy unit(s) to the K selected-for-charging electrical energy unit(s), the controller circuit 120 is operable to return the balancing process 200 to step 206 to repeat the preceding discharging-then-charging cycle (for a certain amount of time (adjustable) or for a certain number of cycles (adjustable)); otherwise, the balancing process 200 ends in step 212.

In one embodiment, one or more balancing processes are executed until either the controller circuit 120 or an external controller circuit (which is adapted to communicate with the controller circuit 120) is operable to determine that a balancing goal has been achieved. And the external controller circuit, if utilized, may be adapted to instruct the controller circuit 120 to select each electrical energy unit for charging or discharging or idling, and/or to perform a balancing process for a certain amount of time. In another embodiment, the balancing goal may be selected from one or more of the following goals including: approximate voltage equalization among all the N electrical energy units; approximate SOC equalization among all the N electrical energy units; approximate equalization of a selected parameter among all the N electrical energy units.

And in another embodiment, at the end of each balancing process, the controller circuit 120 may be adapted to estimate the energy (in watt-hours or joules, for instance) and/or capacity (in amp-hours or coulombs, for instance) discharged by each selected-for-discharging electrical energy unit, and to estimate energy and/or capacity charged to each selected-for-charging electrical energy unit. If only the external controller circuit has direct access to appropriate sensors, the external controller circuit may be adapted to periodically transmit real-time measurement data (e.g., voltages, SOC, current, internal impedances, and/or temperatures) to the controller circuit 120 to assist in estimation of energy or capacity discharged by or charged to an electrical energy unit. And if the external controller circuit detects any fault condition(s), it may be adapted to command the controller circuit 120 to immediately terminate an ongoing balancing process via a communications interface, and/or via one or more input/output (I/O) lines, and/or via some other appropriate means.

In one embodiment, to reduce switching noise, each electrical energy unit of the string 190 is preferably adapted to be coupled in parallel with one or more bypass capacitors; and to suppress voltage transients, each electrical energy unit of the string 190 is preferably adapted to be coupled in parallel with one or more transient voltage suppressors (such as zener diodes, and/or varistors, and/or other equivalents).

Figure 4:
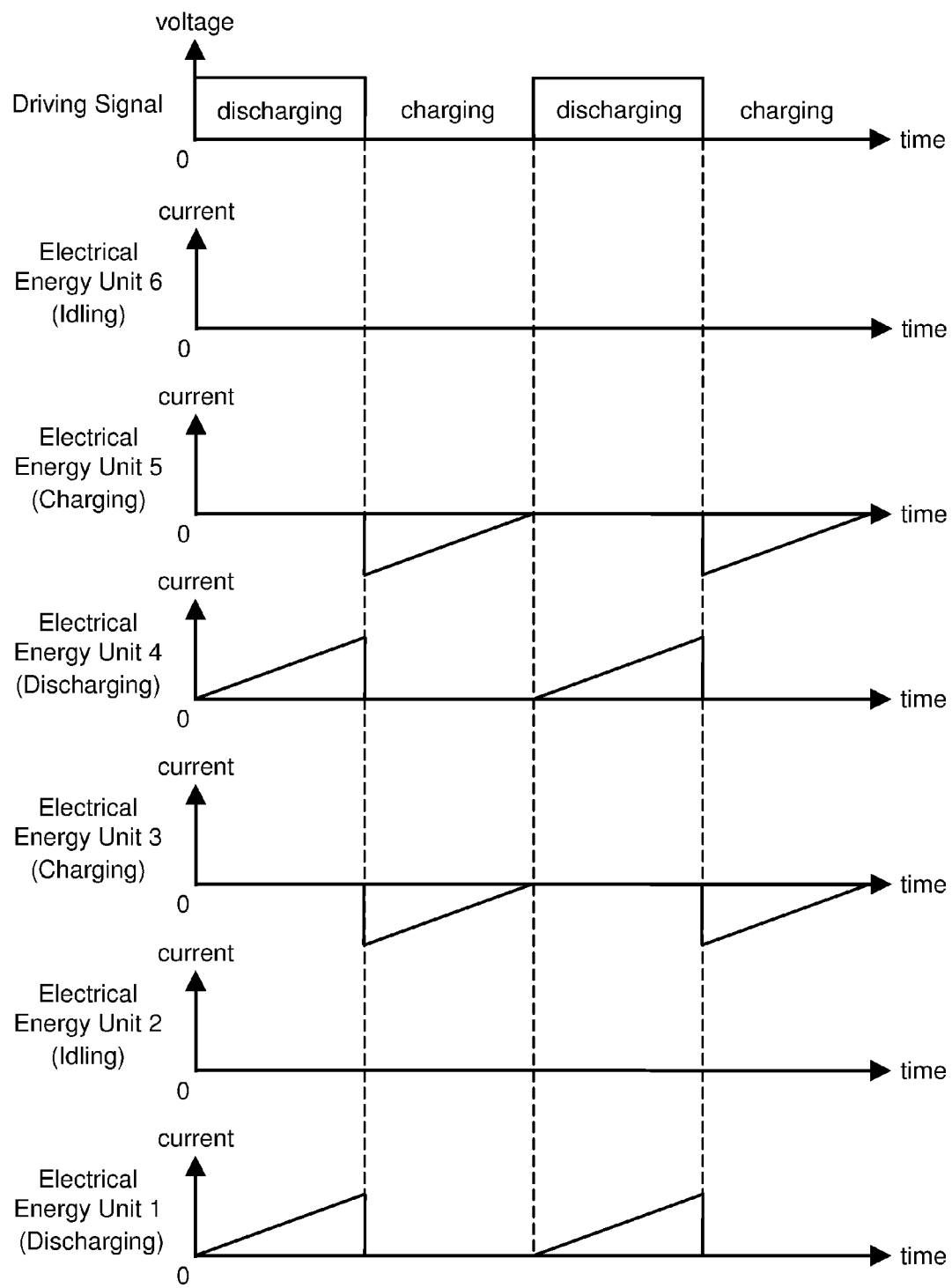
FIG. 4 illustrates baseline charging, discharging, and idling current waveforms corresponding to a driving signal according to the first embodiment of the present invention illustrated in FIG. 1, and in this case assumes that the string contains 6 series-connected electrical energy units.

FIG. 4 illustrates baseline current waveforms corresponding to a driving signal during a balancing process according to the first embodiment of the present invention illustrated in FIG. 1. This case assumes that the string 190 contains 6 identical DC electrical energy units, and in this case assumes that the controller circuit 120 selects electrical energy units 1 and 4 for discharging, selects electrical energy units 3 and 5 for charging, and selects the remaining electrical energy units 2 and 6 for idling. This case assumes that the controller circuit 120 controls balancing via a 50%-duty-cycle driving signal for evenly discharging and charging respective electrical energy units. Electrical energy units 1 and 4 generate positive currents in respective windings for discharging; electrical energy units 3 and 5 receives negative induced currents from respective windings for charging; while electrical energy units 2 and 6 do not have any charge transfer, therefore the respective current waveforms show no currents.

However, in real word applications, output voltage varies from one electrical energy unit to another; internal impedance also varies from one electrical energy unit to another; and a diode is frequently utilized to isolate an electrical energy unit being charged from a corresponding winding; and there is usually some leakage inductance associated with each winding; and so forth.

Figure 5:
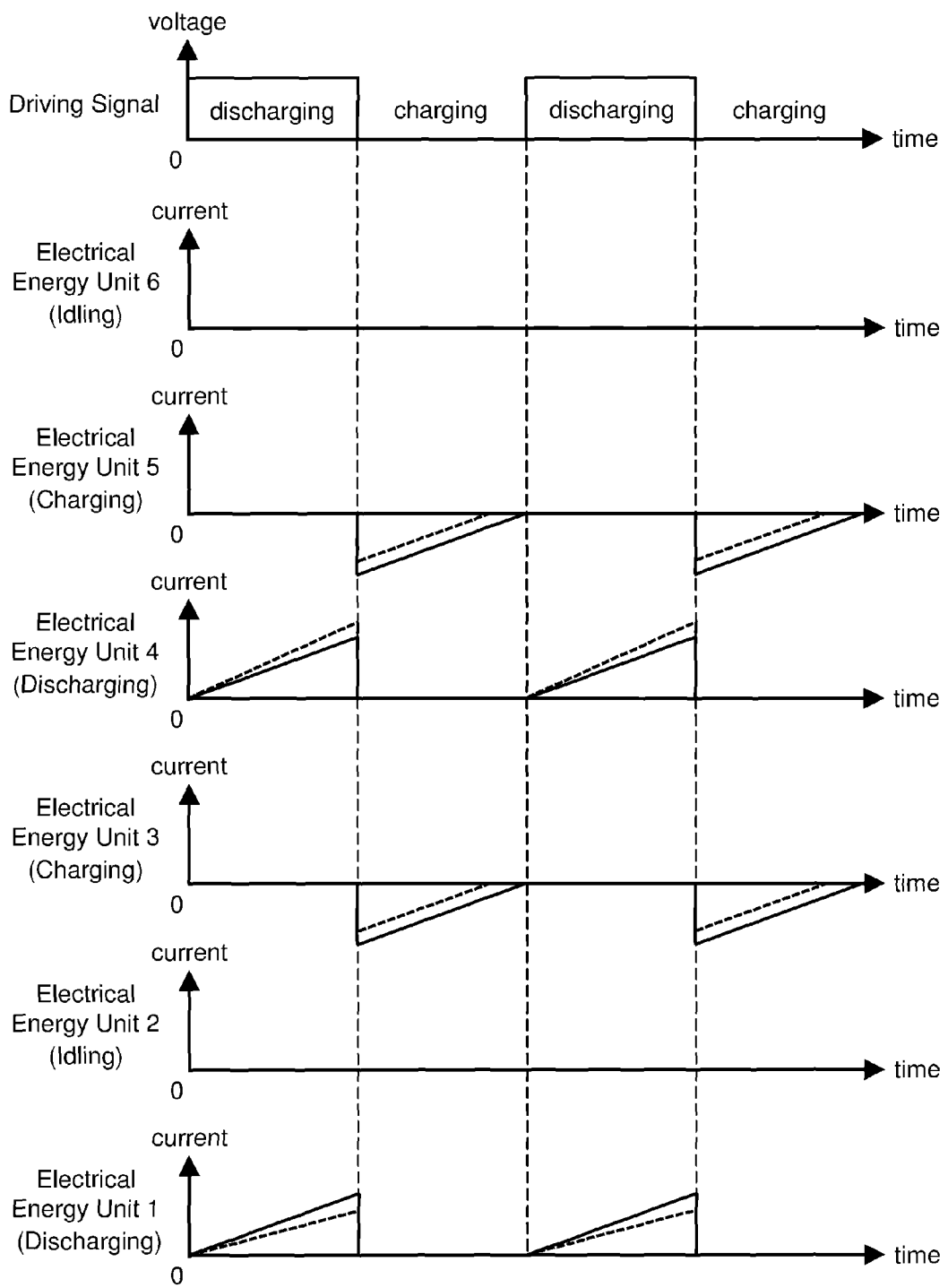
FIG. 5 illustrates more realistic charging and discharging current waveforms compared with the baseline current waveforms illustrated in FIG. 4, and in this case assumes that electrical energy unit 4 has a slightly higher output voltage than electrical energy unit 1, and that charging currents to electrical energy units 3 and 5 flow through two respective diodes.

FIG. 5 is a substantially identical copy of FIG. 4, except that it illustrates how the current waveforms change from baseline shapes to more realistic shapes in two real-world application scenarios. The first scenario assumes that the output voltage from electrical energy unit 4 is slightly higher than that of electrical energy unit 1, and this slight difference causes the excitation current (dotted slope) from electrical energy unit 4 to rise more quickly than the baseline current (solid slope), and causes the excitation current (dotted slope) from electrical energy unit 1 to rise more slowly than the baseline current (solid slope). The differences in excitation currents desirably results in minor self-balancing among all selected-for-discharging electrical energy units.

The second scenario assumes that a diode is utilized to isolate each electrical energy unit being charged from a corresponding winding, and this causes the amplitudes of charging currents for both electrical energy units 3 and 5 to be reduced from baseline currents (solid slopes) to more realistic currents (dotted slopes). And when there are differences in output voltages and/or internal impedances among electrical energy units selected for charging, even though these are not illustrated, as a general rule of thumb, the lower the output voltage, or the smaller the internal impedance, the more charging current an electrical energy unit receives. The differences in induced currents desirably results in minor self-balancing among all selected-for-charging electrical energy units.

Figure 6:
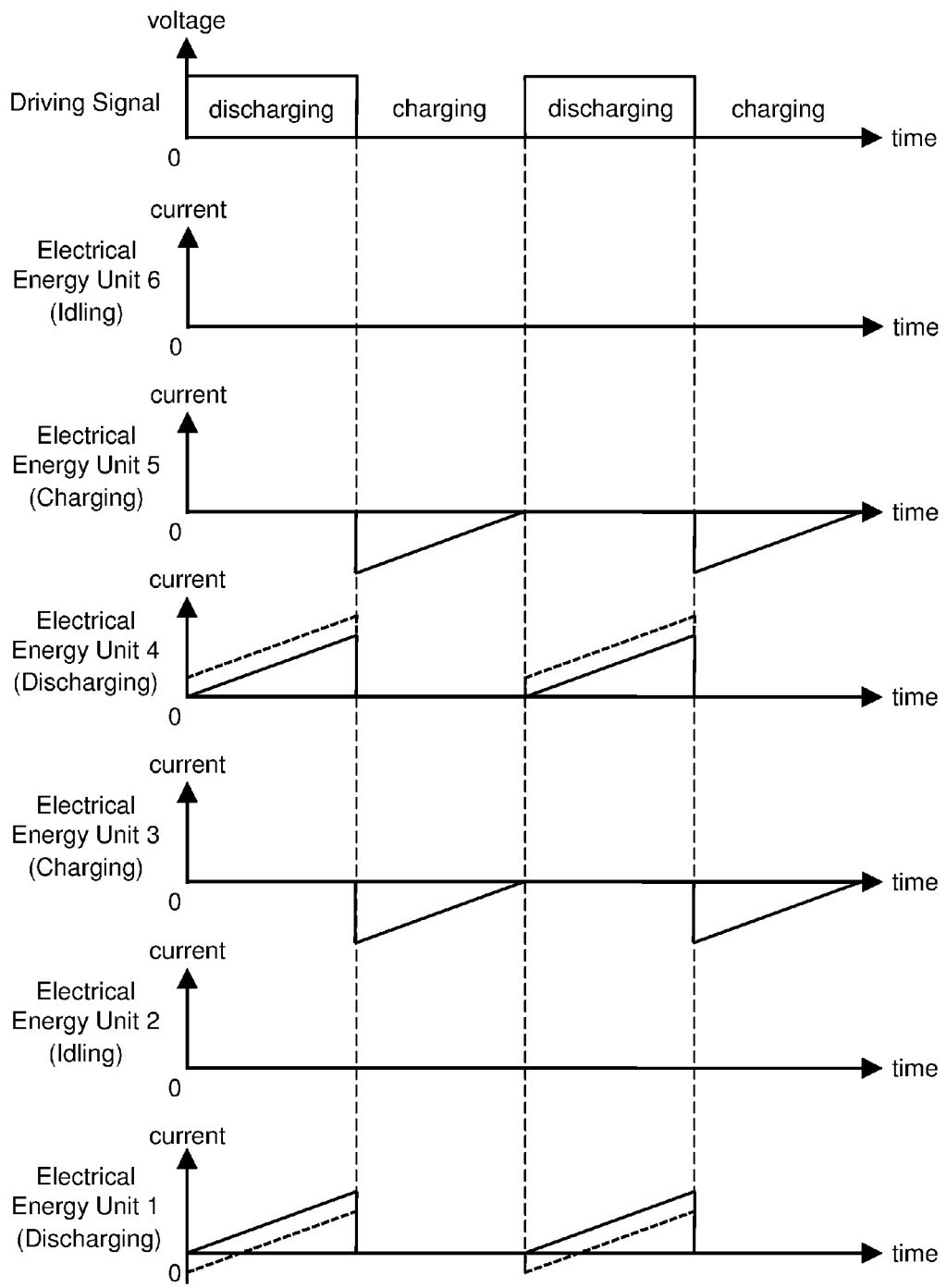
FIG. 6 illustrates another set of more realistic charging and discharging current waveforms compared with the baseline current waveforms illustrated in FIG. 4, and in this case assumes that electrical energy unit 4 has a significantly higher output voltage than electrical energy unit 1.

FIG. 6 is a substantially identical copy of FIG. 4, except that it illustrates a third real-world application scenario. This assumes that the output voltage from electrical energy unit 4 is significantly higher than that of electrical energy unit 1, and this significant difference causes the current for electrical energy unit 1 to become partially negative (which means the current is charging electrical energy unit 1 in the beginning portion) before the current becomes positive (for discharging) again, and also causes the discharging current from electrical energy unit 4 to jump proportionally (from a solid slope to a dotted slope).

The partial negative charging current in the third real-world scenario illustrated in FIG. 6 is to some extent analogous to how a forward converter works. One way to eliminate this forward-converter effect is using a BJT as one of the electronic switches in a discharging configuration, because current cannot flow from an emitter to a collector for a NPN-type BJT, or from a collector to an emitter for a PNP-type BJT. Nevertheless, in real world applications, as long as voltage differentials among discharging electrical energy units are not significant, the balancing apparatus 100 still works to some extent analogous to how a fly-back converter works.

Figure 7:
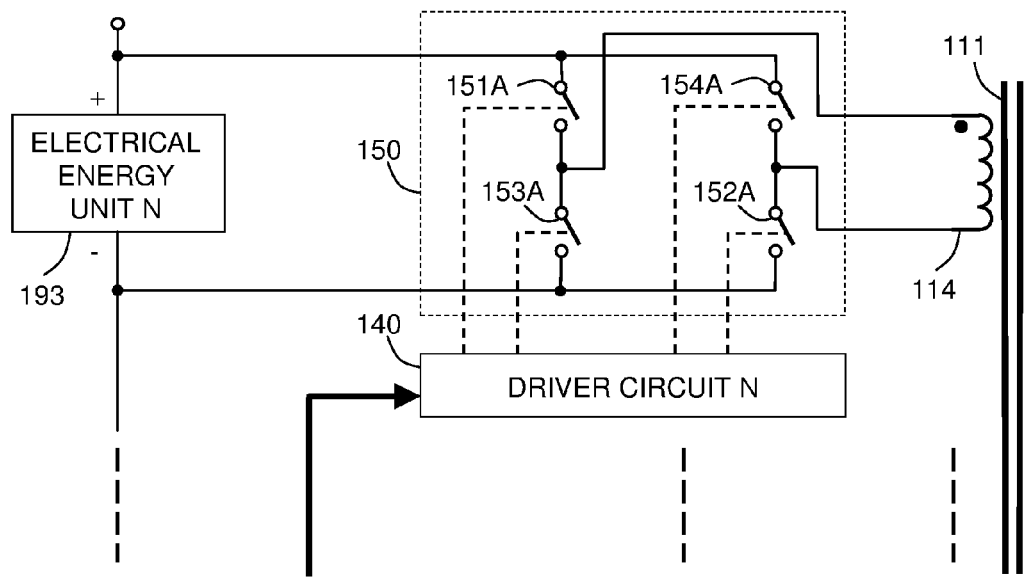
FIG. 7, as a partial view of FIG. 1, illustrates one basic embodiment of a switch circuit, in accordance with the first embodiment of the present invention.

FIG. 7, as a partial view of FIG. 1, illustrates one embodiment of the switch circuit 150, wherein the switch circuit 150 comprises electronic switches 151A, 152A, 153A and 154A. When only the electronic switches 151A and 152A are turned on by the driver circuit 140 to form a discharging configuration, the electrical energy unit 193 is coupled to energize the winding 114. When only the electronic switches 153A and 154A are turned on by the driver circuit 140 to form a charging configuration, the electrical energy unit 193 is coupled to be charged by an induced current from the winding 114. Otherwise, when at least 3 of the 4 electronic switches are turned off by the driver circuit 140 to form an idling configuration, the electrical energy unit 193 is uncoupled from the winding 114 and stays idle. It should be noted that designation of a charging or discharging configuration is arbitrary and relative: for instance, alternatively, the electronic switches 153A and 154A may be turned on to form a discharging configuration, while the electronic switches 151A and 152A may be turned on to form a charging configuration.

Figure 8:
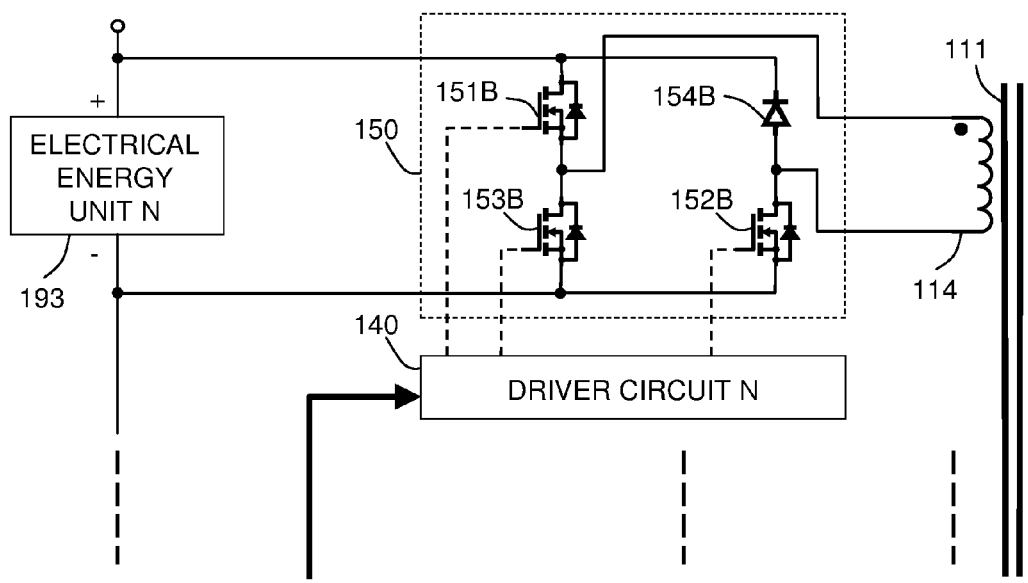
FIG. 8, as a partial view of FIG. 1, illustrates one detailed embodiment of a switch circuit, in accordance with the first embodiment of the present invention.

FIG. 8, as a partial view of FIG. 1, illustrates a more detailed embodiment of the switch circuit 150, wherein the switch circuit 150 comprises: a first FET 151B; a second FET 152B, wherein the discharging configuration is formed when only the first FET 151B and the second FET 152B are turned on by the respective driver circuit 140 thereby coupling the respective winding 114 to the respective electrical energy unit 193 to be energized; a third FET 153B, wherein the idling configuration is formed when the first FET 151B and the second FET 152B and the third FET 153B are turned off by the respective driver circuit 140 to uncouple the respective electrical energy unit 193 from the respective winding 114 thereby idling the respective electrical energy unit 193; and a doide 154B, wherein the charging configuration is formed when only the third FET 153B, in conjunction with the doide 154B, is turned on by the respective driver circuit 140 thereby coupling the respective electrical energy unit 193 to the respective winding 114 to be charged with an induced current. Please note that other types of transistors can be used in various alternative embodiments of switch circuits.

To improve charging efficiency, the doide 154B is preferably a Schottky diode, which has a lower forward voltage than a regular diode. In addition, with this embodiment, one benefit is that at the end of a discharging period by the electrical energy unit 193, energy stored in leakage inductance of the winding 114 can partially be recovered back to the electrical energy unit 193 through the current path from the body diode of the FET 153B to the doide 154B. It should also be noted that the FET 153B (and related gate driver) and the doide 154B can be exchanged in their respective positions without affecting the formation of an equivalent charging configuration.

Figure 9:
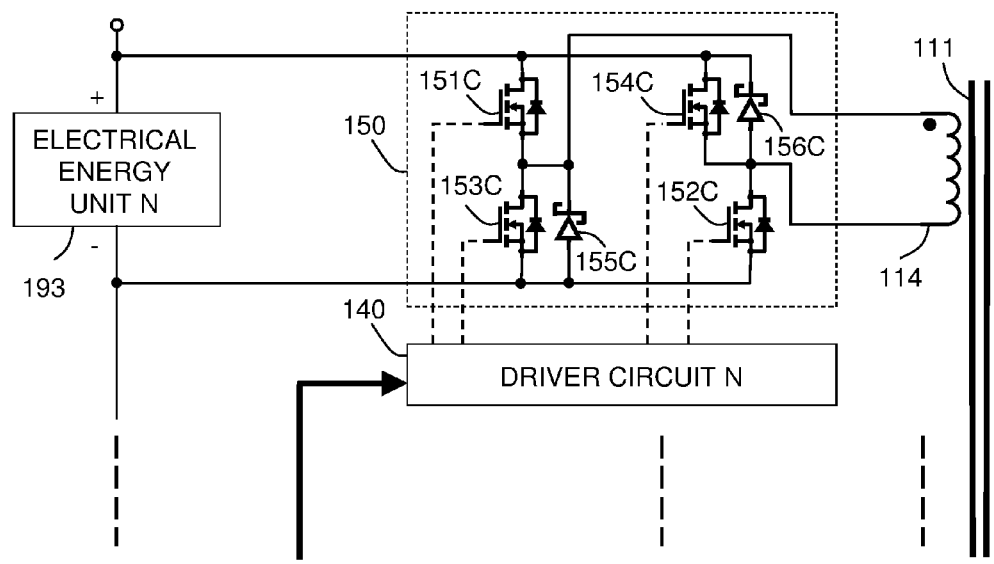
FIG. 9, as a partial view of FIG. 1, illustrates another detailed embodiment of a switch circuit with a pseudo-synchronous-rectifier scheme, in accordance with the first embodiment of the present invention.

To further improve charging efficiency, FIG. 9, as a partial view of FIG. 1, illustrates an improved embodiment with a pseudo-synchronous-rectifier scheme for the switch circuit 150, wherein the switch circuit 150 comprises: a first FET 151C; a second FET 152C, wherein the discharging configuration is formed when only the first FET 151C and the second FET 152C are turned on by the respective driver circuit 140 thereby coupling the respective winding 114 to the respective electrical energy unit 193 to be energized; a third FET 153C; a fourth FET 154C, wherein the idling configuration is formed when the first FET 151C and the second FET 152C and the third FET 153C and the fourth FET 154C are turned off by the respective driver circuit 140 to uncouple the respective electrical energy unit 193 from the respective winding 114 thereby idling the respective electrical energy unit 193, and the fourth FET 154C being operable to be turned on by a pseudo-synchronous-rectifier driving signal from the respective driver circuit 140 only during a portion of the second period of time, and wherein the charging configuration is formed when only the third FET 153C, in conjunction with the partially-on fourth FET 154C, is turned on by the respective driver circuit 140 thereby coupling the respective electrical energy unit 193 to the respective winding 114 to be charged with an induced current; an optional first Schottky doide 155C, being coupled in parallel with the body diode of the third FET 153C to recover more energy stored in leakage inductance of the respective winding 114; and an optional second Schottky doide 156C, being coupled in parallel with the body diode of the fourth FET 154C to improve balancing efficiency.

Figure 10:
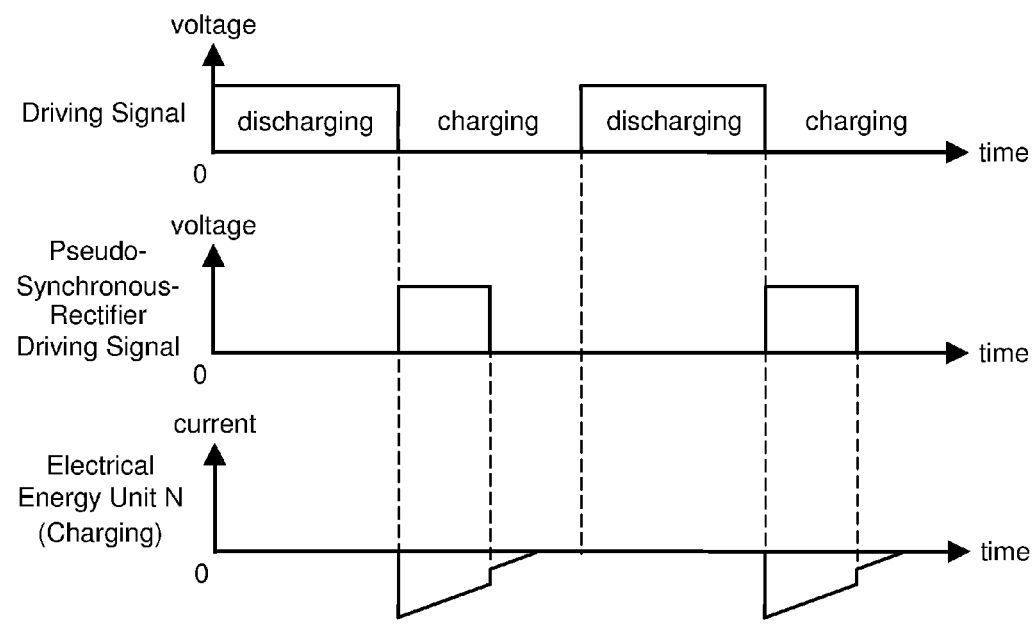
FIG. 10, in conjunction with FIG. 9, illustrates some driving signals and current waveform related to the pseudo-synchronous-rectifier implementation, in accordance with the first embodiment of the present invention.

FIG. 10 illustrates 3 waveforms related to the pseudo-synchronous-rectifier implementation: a driving signal for overall balancing, a pseudo-synchronous-rectifier driving signal, and a current waveform for the N-th electrical energy unit 193. Referring to both FIG. 9 and FIG. 10, the pseudo-synchronous-rectifier functions as follows: when the FET 153C is turned on for charging the electrical energy unit 193, the FET 154C is also turned on but only during a portion (preferably a leading portion with an optional leading dead time) of a charging period (i.e., the second period of time); assuming the FET 154C is turned on during the beginning 50% of a charging period, more charge current can be recovered during this time as is illustrated by a higher charging current in the current waveform. It should be noted that the higher a current, the higher a forward voltage drop across a diode, therefore in practice, even a 50% pseudo-synchronous-rectifier may reduce energy wasted across the body diode of the FET 154C or the Schottky diode 156C by more than 60%. This embodiment is a low-cost way to implement a reasonably effective synchronous rectifier via a simple open-loop control.

Figure 11:
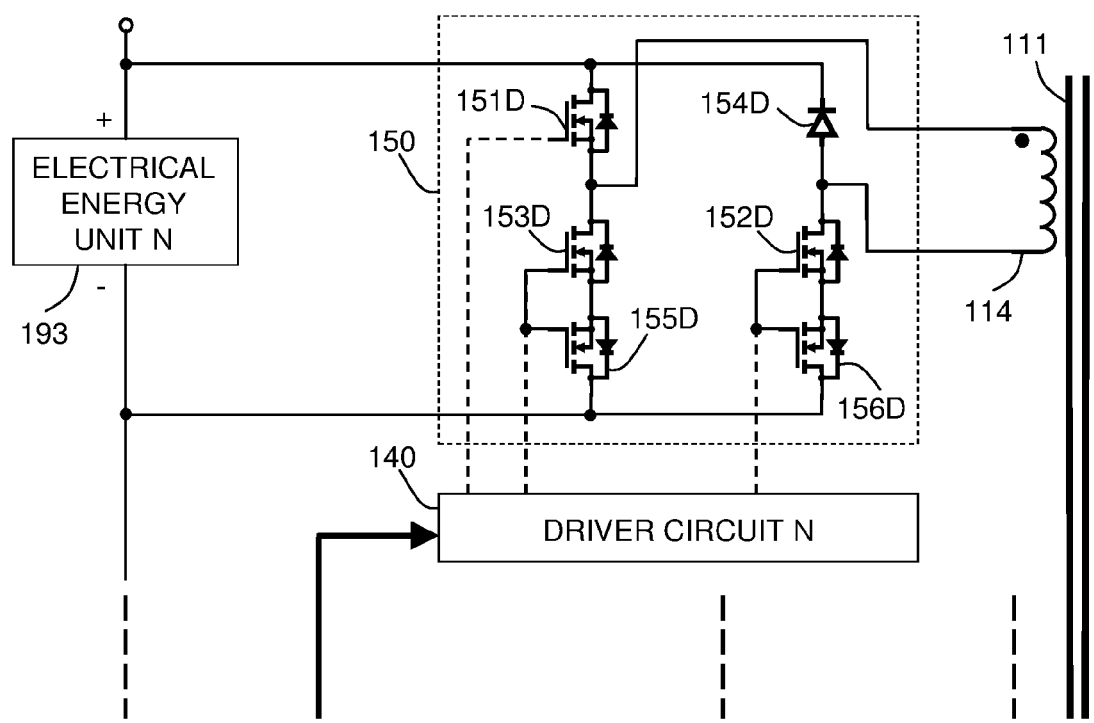
FIG. 11, as a partial view of FIG. 1, illustrates another detailed embodiment of a switch circuit with current isolation when other electrical energy unit(s) are discharging or charging, in accordance with the first embodiment of the present invention.

Referring back to FIG. 8 and FIG. 1, if the largest voltage differential between any two electrical energy units within the string 190 exceeds the combined forward voltage drop of two diodes, to prevent any unintentional charging to any electrical energy unit, current isolation may be necessary. FIG. 11, as a partial view of FIG. 1, illustrates another detailed embodiment of the switch circuit 150 with current isolation when other electrical energy unit(s) are discharging or charging. Specifically, the switch circuit 150 comprises N-channel FETs 151D, 152D, 153D, 155D, and 156D, and a doide 154D. FETs 152D and 156D form a FET pair which has a common gate node, a common source node, and 2 opposing body diodes; and if both FETs 152D and 156D are turned off, no current can flow pass their body diodes, thereby achieving current isolation when other electrical energy unit(s) are discharging. FETs 153D and 155D form another FET pair which has a common gate node, a common source node, and 2 opposing body diodes; and if both FETs 153D and 155D are turned off, no current can flow pass their body diodes, thereby achieving current isolation when other electrical energy unit(s) are being charged. When only the FETs 151D, 152D and 156D are turned on by the driver circuit 140 to form the discharging configuration, the electrical energy unit 193 is coupled to energize the winding 114. When only the FETs 153D and 155D are turned on by the driver circuit 140 to form the charging configuration in conjunction with the doide 154D, the electrical energy unit 193 is coupled to be charged with an induced current from the winding 114. Otherwise, when all the FETs 151D, 152D, 153D, 155D, and 156D are turned off by the driver circuit 140 to form the idling configuration, the electrical energy unit 193 is uncoupled from the winding 114 and stays idle with current isolation protection.

Whether or not to add the FET 155D for current isolation during charging is optional and may not be as critical for some applications. Without the FET 155D, immediately after a discharging period (i.e., the first period of time) by the electrical energy unit 193, energy stored in leakage inductance of the winding 114 can be partially recovered back to the electrical energy unit 193 through the current path from the body diode of the FET 153D to the doide 154D. It should also be noted that to achieve current isolation, in addition to sharing a common gate node and a common source node between a pair of FETs, one alternative is to share a common gate node and a common drain node between a pair of FETs. Another alternative is to replace the FET pair 152D and 156D with a BJT to achieve current isolation when any other electrical energy unit is discharging, because current cannot flow from an emitter to a collector in a NPN-type BJT, or from a collector to an emitter in a PNP-type BJT.

Still referring to FIG. 1, there are many possible ways to design a suitable driver circuit. In one embodiment, each driver circuit comprises: a plurality of FET gate drivers; one or more level-shifters (such as digital isolators, opto-isolators, pulse transformers, or any other type of level shifters); a charging/discharging/idling selection circuit; one or more power supplies; and an optional over-current protection circuit, the over-current protection circuit including at least one current sensor. For the top electrical energy unit 193, the corresponding driver circuit 140 may include one or more dedicated power supplies generated via a voltage multiplier circuit or an equivalent circuit (such as a boost converter). Otherwise, for any electrical energy unit below the top one, a corresponding driver circuit may include power supplies generated by coupling to some upper and/or lower electrical energy unit(s). Please note that instead of being implemented in a driver circuit, the charging/discharging/idling selection circuit may be implemented in the controller circuit 120 in various alternative embodiments.

There are also many possible ways to design a suitable controller circuit. In one embodiment, the controller circuit 120 comprises: a microcontroller or a microprocessor, the microcontroller or the microprocessor including memory and I/Os and communications ports and firmware, and being operable to communicate with one or more external controller circuits; an internal communications interface, being used by the microcontroller or the microprocessor to communicate with and control all the driver circuits; one or more power supplies, optionally including at least one transient voltage suppressor for over-voltage protection; one or more optional isolators, being used for external communications; and an optional temperature sensor, being operable to measure temperature at a location in the apparatus 100. The communications ports may include Serial-Peripheral-Interface (SPI), and/or Inter-Integrated-Circuit (IIC), and/or RS232, and/or Controller-Area-Network (CAN). The internal communications interface maybe as simple as a plurality of daisy-chained shift registers, or some other serial interface. The power supplies may either come from an external source, or derive directly from some bottom electrical energy unit(s) in the string 190.

In one embodiment, the transformer 110 is constructed in one or more of the following ways including: the magnetic core 111 is adapted to have a toroidal shape (so that all the N windings may have essentially matched electromagnetic characteristics) preferably with a circular cross-section; all the N windings are adapted to be wound in an identical direction; all the N windings have identical number of turns; each winding is adapted to be spread over the entire magnetic core 111; all the N windings are adapted to be wound in an interleave pattern around the magnetic core 111 preferably without any overlapping.

In another embodiment, to reduce leakage inductance of the N windings thereby improving balancing efficiency and reducing EMI, the apparatus 100 further comprises: a shielding, being made of non-ferrous metal(s) (such as copper or aluminum or an alloy or an equivalent material), and wherein all the N windings, except all leads of the N windings, are covered in between the shielding and the magnetic core 111, and the shielding not forming any short-circuit turn surrounding a flux path in the magnetic core 111. In one embodiment, the shielding may be constructed using copper or aluminum foils or tapes or equivalents. In another embodiment, the shielding may also be constructed using some EMI shielding paints or coatings.

Still referring to FIG. 1, in one embodiment, the transformer 110 optionally further includes one additional winding, the additional winding being adapted to be coupled to both ends of the entire string 190 via one special switch circuit and one special driver circuit, thereby enabling the apparatus 100 to perform bi-directional charge transfer between one or more electrical energy units and the entire string 190. However, the cost to build such a balancing apparatus may be increased substantially.

There are a number of feasible ways to improve balancing power by coupling a portion of the apparatus 100 in parallel with one duplicate or a plurality of duplicates of the portion of the apparatus 100. Still referring to FIG. 1, in one embodiment, to further shorten balancing time thereby increasing balancing power of the apparatus 100, the apparatus 100 further comprises one duplicate or a plurality of duplicates of the transformer 110, and each winding of each duplicate of the transformer is adapted to be coupled in parallel with a respective winding of the transformer 100. In another embodiment, one duplicate or a plurality of duplicates of the apparatus 100 may optionally be adapted to be coupled in parallel with the string 190, and all the apparatuses are preferably adapted to be phase-shifted evenly during balancing thereby minimizing charging and discharging transients, and each apparatus preferably includes a sync input to assist in synchronization of balancing.

Figure 12:
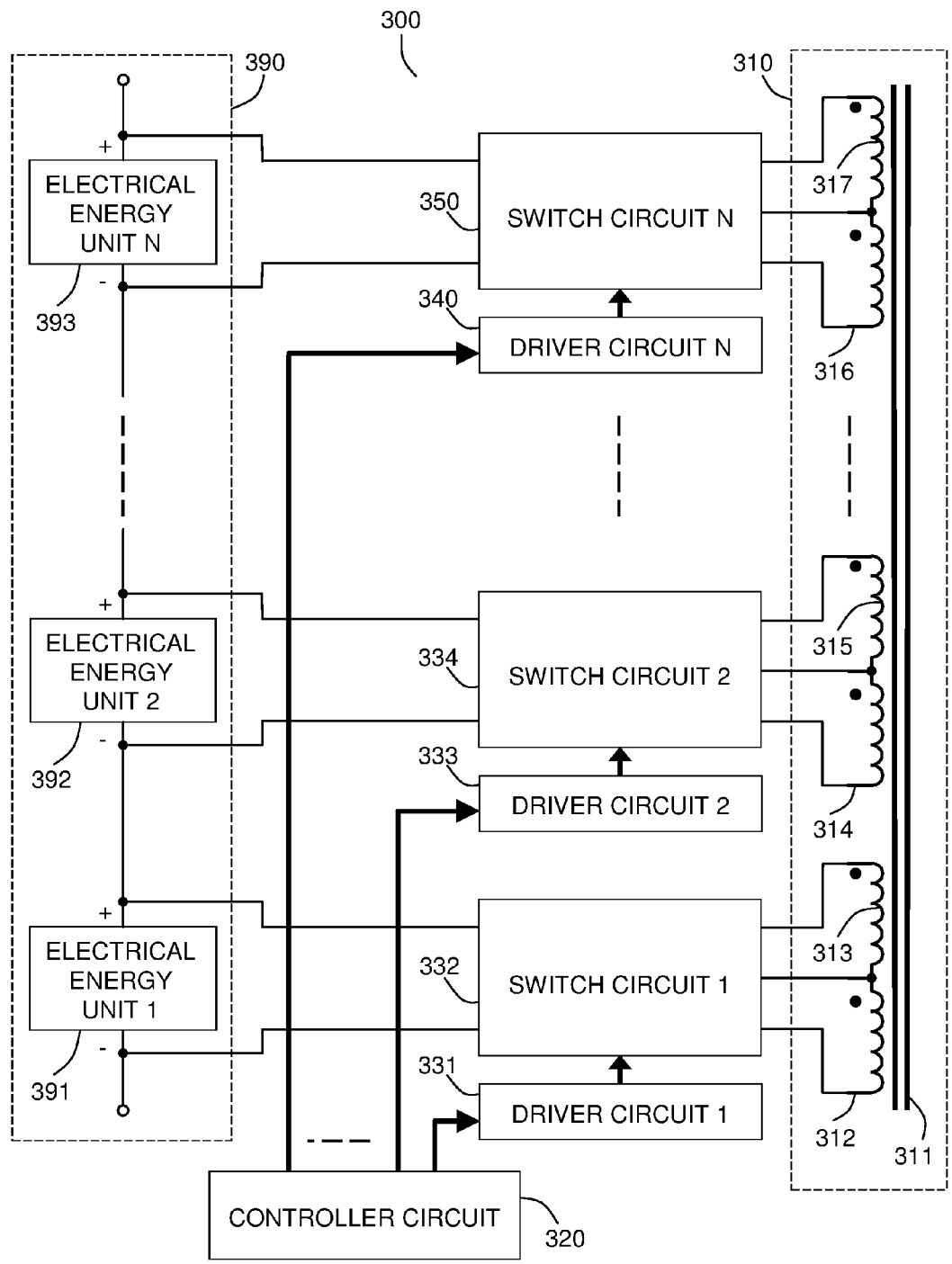
FIG. 12 is a block diagram illustrating the basic structure of an apparatus for balancing N series-connected electrical energy units coupled to N respective pairs of windings of a transformer, in accordance with a second embodiment of the present invention.

In a second embodiment of the present invention, as illustrated in FIG. 12, an apparatus 300 for balancing a string 390 of N (where N>2) series-connected electrical energy units (including a first electrical energy unit 391, a second electrical energy unit 392, . . . , and an N-th electrical energy unit 393), the apparatus 300 comprising: a transformer 310, the transformer 310 including a magnetic core 311, and N charging windings (including a first charging winding 313, a second charging winding 315, . . . , and an N-th charging winding 317) corresponding to the N electrical energy units, and N discharging windings (including a first discharging winding 312, a second discharging winding 314, . . . , and an N-th discharging winding 316) corresponding to the N electrical energy units; N switch circuits (including a first switch circuit 332, a second switch circuit 334, . . . , and an N-th switch circuit 350) corresponding to the N electrical energy units, each switch circuit including a plurality of electronic switches operable to couple a respective electrical energy unit to a respective discharging winding in a discharging configuration, or to couple the respective electrical energy unit to a respective charging winding in a charging configuration, or to uncouple the respective electrical energy unit from the respective discharging winding and the respective charging winding in an idling configuration; N driver circuits (including a first driver circuit 331, a second driver circuit 333, . . . , and an N-th driver circuit 340), being respectively coupled to the N switch circuits, each driver circuit being operable to turn ON/OFF electronic switches of a respective switch circuit; and a controller circuit 320, being coupled to the N driver circuits, and operable to select each electrical energy unit for charging or discharging or idling, and operable to control simultaneously couple all selected-for-discharging electrical energy unit(s) to respective discharging winding(s) in discharging configuration(s) for a first period of time (adjustable) to simultaneously energize the respective discharging winding(s), then immediately or after a short delay, operable to control simultaneously coupling all selected-for-charging electrical energy unit(s) to respective charging winding(s) in charging configuration(s) for a second period of time (adjustable) to be charged with respective induced current(s).

Compared with all prior-art, the novelties of the present invention as described in the second embodiment are based on the combination of the following: balancing based on one transformer; allowing selection of transferring charge from any one or any plurality of electrical energy units to another one or another plurality of electrical energy units via the transformer; the capability to simultaneously energize a plurality of discharging windings (not all the N discharging windings) for a period of time and then release stored energy through one or a plurality of charging windings in another period of time.

Designation of a winding as a charging winding or as a discharging winding is arbitrary and relative. One terminal of each charging winding is preferably adapted to be coupled to one opposite-polarity terminal of a corresponding discharging winding. Charge can be transferred bi-directionally between any one or any plurality of electrical energy units and another one or another plurality of electrical energy units within the string 390. In one embodiment, the ratio of the nominal voltage of each electrical energy unit over the number of turns of a respective discharging winding is essentially identical within the entire string 390. And in another embodiment, preferably, though not necessarily, the number of turns of every discharging winding of the transformer 310 is adapted to be identical. And in another embodiment, preferably, though not necessarily, the number of turns of every charging winding of the transformer 310 is adapted to be identical. And in another embodiment, all the N electrical energy units are preferably adapted to be nominally identical or equivalent. In various embodiments, each pair of charging and discharging windings for each electrical energy unit may be adapted to be wound independently (not illustrated) or share a center tap (illustrated in FIG. 12).

To start a balancing process that can be executed by the apparatus 300, out of the N electrical energy units, M (where 1≤M<N) unit(s) are selected for discharging by the controller circuit 320; out of the remaining (N−M) electrical energy unit(s), K (where 1≤K≤(N−M)) unit(s) are selected for charging by the controller circuit 320; all the remaining (N−M−K) electrical energy unit(s), if ((N−M−K)≥1), are selected by the controller circuit 320 for idling; to discharge the M selected-for-discharging electrical energy unit(s), the controller circuit 320 is operable to control M respective driver circuit(s) to simultaneously turn on M respective switch circuit(s) in discharging configuration(s) for a period of time, so that M respective discharging winding(s) are coupled to the M respective selected-for-discharging electrical energy unit(s) to be energized simultaneously; then immediately or after a short delay, to charge the K selected-for-charging electrical energy unit(s), the controller circuit 320 is operable to control K respective driver circuit(s) to simultaneously turn on K respective switch circuit(s) in charging configuration(s) for another period of time, so that the K selected-for-charging electrical energy unit(s) are coupled to K respective charging winding(s) to be charged with respective induced current(s); and the controller circuit 320 is operable to repeat the preceding discharging-then-charging cycle if more charge needs to be transferred from the M selected-for-discharging electrical energy unit(s) to the K selected-for-charging electrical energy unit(s).

One or more of the aforementioned balancing processes may be executed until either the controller circuit 320 or an external controller circuit (which is adapted to communicate with the controller circuit 320) is operable to determine that a balancing goal has been achieved.

Figure 13:
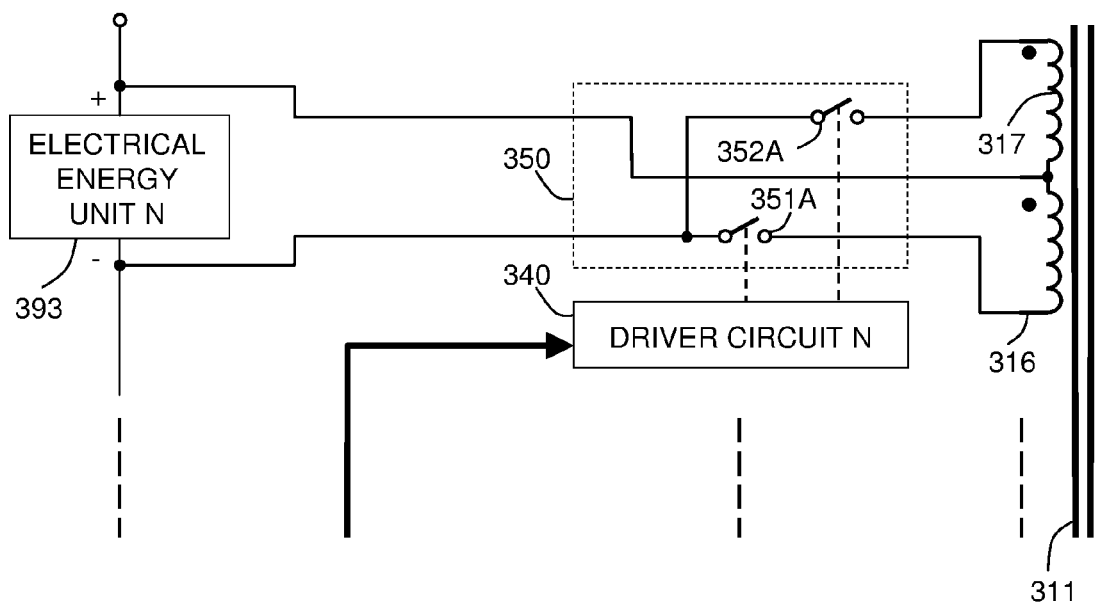
FIG. 13, as a partial view of FIG. 12, illustrates one basic embodiment of a switch circuit, in accordance with the second embodiment of the present invention.

Still referring to FIG. 12, each electronic switch of a switch circuit may be either a transistor, or a diode, or an equivalent device. There are many feasible ways to design a suitable switch circuit. FIG. 13, as a partial view of FIG. 12, illustrates one embodiment of the switch circuit 350, wherein the switch circuit 350 comprises: a first electronic switch 351A, wherein the discharging configuration is formed when only the first electronic switch 351A is turned on by the respective driver circuit 340 thereby coupling the respective discharging winding 316 to the respective electrical energy unit 393 to be energized; and a second electronic switch 352A, wherein the charging configuration is formed when only the second electronic switch 352A is turned on by the respective driver circuit 340 thereby coupling the respective electrical energy unit 393 to the respective charging winding 317 to be charged with an induced current, and wherein the idling configuration is formed when both the first electronic switch 351A and the second electronic switch 352A are turned off by the respective driver circuit 340 to uncouple the respective electrical energy unit 393 from the respective discharging winding 316 and the respective charging winding 317 thereby idling the respective electrical energy unit 393.

In a third embodiment of the present invention, a method to fabricate an apparatus for balancing a string of N (where N>2) series-connected electrical energy units, the method comprising: constructing a transformer, the transformer including a magnetic core and N windings corresponding to the N electrical energy units; constructing N switch circuits corresponding to the N electrical energy units, each switch circuit including a plurality of electronic switches operable to couple a respective electrical energy unit to a respective winding in a discharging configuration, or to couple the respective electrical energy unit to the respective winding in a charging configuration, or to uncouple the respective electrical energy unit from the respective winding in an idling configuration; constructing N driver circuits, being respectively coupled to the N switch circuits, each driver circuit being operable to turn ON/OFF electronic switches of a respective switch circuit; and constructing a controller circuit, being coupled to the N driver circuits, and operable to select each electrical energy unit for charging or discharging or idling, and operable to control simultaneously coupling all selected-for-discharging electrical energy unit(s) to respective winding(s) in discharging configuration(s) for a first period of time to simultaneously energize the respective winding(s), then immediately or after a short delay, operable to control simultaneously coupling all selected-for-charging electrical energy unit(s) to respective winding(s) in charging configuration(s) for a second period of time to be charged with respective induced current(s).

INDUSTRIAL APPLICABILITY

In view of the foregoing, the industrial applicability of the present invention is broad and can provide a high-efficiency and low-cost apparatus and related methods for balancing a string of series-connected electrical energy units based on a shared transformer. The apparatus can balance not only a short string, but also a long string of more than 100 series-connected electrical energy units. The apparatus can find widespread commercial applications including battery-powered tools, uninterruptable power supplies (UPS), all types of hybrid and all-electric vehicles, and energy storage for solar power and wind power.

While the foregoing invention shows a number of illustrative and descriptive embodiments of the present invention, it will be apparent to any person with ordinary skills in the area of technology related to the present invention that various changes, modifications, substitutions and combinations can be made herein without departing from the scope or the spirit of the present invention as defined by the following claims.

The invention claimed is:

1. An apparatus for balancing a string of N (where N>2) series-connected electrical energy units, the apparatus comprising:
   a transformer, the transformer including a magnetic core and N windings corresponding to the N electrical energy units;
   N switch circuits corresponding to the N electrical energy units, each switch circuit including a plurality of electronic switches operable to couple a respective electrical energy unit to a respective winding in a discharging configuration, or to couple the respective electrical energy unit to the respective winding in a charging configuration, or to uncouple the respective electrical energy unit from the respective winding in an idling configuration;
   N driver circuits, being respectively coupled to the N switch circuits, each driver circuit being operable to turn ON/OFF electronic switches of a respective switch circuit; and
   a controller circuit, being coupled to the N driver circuits, to start a balancing process, operable to select each electrical energy unit for charging or discharging or idling, totaling X (where X≥1) unit(s) selected for discharging and Y (where Y≥1) unit(s) selected for charging and Z (where Z≥0) unit(s) selected for idling, operable to maintain the Z selected-for-idling electrical energy unit(s) uncoupled from Z respective winding(s) during the balancing process, operable to control simultaneously coupling the X selected-for-discharging electrical energy unit(s) to X respective winding(s) in discharging configuration(s) for a first period of time (adjustable) to simultaneously energize the X respective winding(s) to store some energy in the magnetic core, then immediately or after a short delay (adjustable), operable to control simultaneously coupling the Y selected-for-charging electrical energy unit(s) to Y respective winding(s) in charging configuration(s) for a second period of time (adjustable) to be charged with respective current(s) induced from the stored energy in the magnetic core, and operable to repeat the preceding discharging-then-charging cycle if more charge needs to be transferred from the X selected-for-discharging electrical energy unit(s) to the Y selected-for-charging electrical energy unit(s).

2. The apparatus of claim 1, wherein one or more balancing processes are executed until either the controller circuit or an external controller circuit is operable to determine that a balancing goal has been achieved.

3. The apparatus of claim 2, wherein the balancing goal may be selected from one or more of the following goals including: approximate voltage equalization among all the N electrical energy units; approximate SOC equalization among all the N electrical energy units; approximate equalization of a selected parameter among all the N electrical energy units.

4. The apparatus of claim 1, wherein each electrical energy unit is selected from one of the following units including: a battery cell; a super-capacitor cell; a battery module comprising a plurality of battery cells connected in series or in parallel or in any combination thereof; a super-capacitor module comprising a plurality of super-capacitor cells connected in series or in parallel or in any combination thereof; some other form of electrical energy cell; some other form of electrical energy module.

5. The apparatus of claim 1, wherein the ratio of a nominal voltage of an electrical energy unit over the number of turns of a respective winding is identical for all the N electrical energy units.

6. The apparatus of claim 5, wherein all the N electrical energy units are nominally identical or equivalent.

7. The apparatus of claim 1, wherein each electronic switch of each switch circuit is a transistor or a diode or an equivalent device.

8. The apparatus of claim 1, wherein each switch circuit comprises:
   a first FET;
   a second FET, wherein the discharging configuration is formed when only the first FET and the second FET are turned on by a respective driver circuit thereby coupling a respective winding to a respective electrical energy unit to be energized;
   a third FET, wherein the idling configuration is formed when the first FET and the second FET and the third FET are turned off by the respective driver circuit to uncouple the respective electrical energy unit from the respective winding thereby idling the respective electrical energy unit; and
   a diode, wherein the charging configuration is formed when only the third FET, in conjunction with the diode, is turned on by the respective driver circuit thereby coupling the respective electrical energy unit to the respective winding to be charged with an induced current.

9. The apparatus of claim 1, wherein each switch circuit comprises:
   a first FET;
   a second FET, wherein the discharging configuration is formed when only the first FET and the second FET are turned on by a respective driver circuit thereby coupling a respective winding to a respective electrical energy unit to be energized; and a third FET;

a fourth FET, wherein the idling configuration is formed when the first FET and the second FET and the third FET and the fourth FET are turned off by the respective driver circuit to uncouple the respective electrical energy unit from the respective winding thereby idling the respective electrical energy unit, and the fourth FET being operable to be turned on by a pseudo-synchronous-rectifier driving signal from the respective driver circuit only during a portion of the second period of time, and wherein the charging configuration is formed when only the third FET, in conjunction with the partially-on fourth FET, is turned on by the respective driver circuit thereby coupling the respective electrical energy unit to the respective winding to be charged with an induced current;

an optional first Schottky diode, being coupled in parallel with the body diode of the third FET to recover more energy stored in leakage inductance of the respective winding; and an optional second Schottky diode, being coupled in parallel with the body diode of the fourth FET to improve balancing efficiency.

10. The apparatus of claim 1, wherein each driver circuit comprises:

a plurality of FET gate drivers;

one or more level-shifters;

a charging/discharging/idling selection circuit;

one or more power supplies; and an optional over-current protection circuit, the over-current protection circuit including at least one current sensor.

11. The apparatus of claim 1, wherein the controller circuit comprises:

a microcontroller or a microprocessor, the microcontroller or the microprocessor including memory and I/Os and communications ports and firmware, and being operable to communicate with one or more external controller circuits;

an internal communications interface, being used by the microcontroller or the microprocessor to communicate with and control all the driver circuits;

one or more power supplies, optionally including at least one transient voltage suppressor for over-voltage protection;

one or more optional isolators, being used for external communications; and an optional temperature sensor, being operable to measure temperature at a location in the apparatus.

12. The apparatus of claim 1, wherein the transformer is constructed in one or more of the following ways including: the magnetic core is adapted to have a toroidal shape; all the N windings are adapted to be wound in an identical direction; all the N windings have identical number of turns; each winding is adapted to be spread over the entire magnetic core; all the N windings are adapted to be wound in an interleave pattern around the magnetic core.

13. The apparatus of claim 1, wherein to reduce leakage inductance of the N windings, the apparatus further comprises:

a shielding, being made of non-ferrous metal(s), and wherein all the N windings, except all leads of the N windings, are covered in between the shielding and the magnetic core, and the shielding not forming any short-circuit turn surrounding a flux path in the magnetic core.

14. The apparatus of claim 1, wherein the transformer optionally further includes one additional winding, the additional winding being adapted to be coupled to both ends of the entire string via one special switch circuit and one special driver circuit, thereby enabling the apparatus to perform bi-directional charge transfer between one or more electrical energy units and the entire string.

15. The apparatus of claim 1, wherein to increase balancing power of the apparatus, the apparatus further comprises one duplicate or a plurality of duplicates of the transformer, and each winding of each duplicate of the transformer is coupled in parallel with a respective winding of the transformer.

16. An apparatus for balancing a string of N (where N>2) series-connected electrical energy units, the apparatus comprising:

a transformer, the transformer including a magnetic core, and N charging windings corresponding to the N electrical energy units, and N discharging windings corresponding to the N electrical energy units;

N switch circuits corresponding to the N electrical energy units, each switch circuit including a plurality of electronic switches operable to couple a respective electrical energy unit to a respective discharging winding in a discharging configuration, or to couple the respective electrical energy unit to a respective charging winding in a charging configuration, or to uncouple the respective electrical energy unit from the respective discharging winding and the respective charging winding in an idling configuration;

N driver circuits, being respectively coupled to the N switch circuits, each driver circuit being operable to turn ON/OFF electronic switches of a respective switch circuit; and a controller circuit, being coupled to the N driver circuits, to start a balancing process, operable to select each electrical energy unit for charging or discharging or idling, totaling X (where X≥1) unit(s) selected for discharging and Y (where Y≥1) unit(s) selected for charging and Z (where Z≥0) unit(s) selected for idling, operable to maintain the Z selected-for-idling electrical energy unit(s) uncoupled from Z respective discharging winding(s) and Z respective charging winding(s) during the balancing process, operable to control simultaneously coupling the X selected-for-discharging electrical energy unit(s) to X respective discharging winding(s) in discharging configuration(s) for a first period of time (adjustable) to simultaneously energize the X respective discharging winding(s) to store some energy in the magnetic core, then immediately or after a short delay (adjustable), operable to control simultaneously coupling the Y selected-for-charging electrical energy unit(s) to Y respective charging winding(s) in charging configuration(s) for a second period of time (adjustable) to be charged with respective current(s) induced from the stored energy in the magnetic core, and operable to repeat the preceding discharging-then-charging cycle if more charge needs to be transferred from the X selected-for-discharging electrical energy unit(s) to the Y selected-for-charging electrical energy unit(s).

17. The apparatus of claim 16, wherein each switch circuit comprises:

a first electronic switch, wherein the discharging configuration is formed when only the first electronic switch is turned on by a respective driver circuit thereby coupling a respective discharging winding to a respective electrical energy unit to be energized; and a second electronic switch, wherein the charging configuration is formed when only the second electronic switch is turned on by the respective driver circuit thereby coupling the respective electrical energy unit to a respective charging winding to be charged with an induced current, and wherein the idling configuration is formed when both the first electronic switch and the second electronic switch are turned off by the respective driver circuit to uncouple the respective electrical energy unit from the respective discharging winding and the respective charging winding thereby idling the respective electrical energy unit.

18. A method to fabricate an apparatus for balancing a string of N (where N>2) series-connected electrical energy units, the method comprising:

constructing a transformer, the transformer including a magnetic core and N windings corresponding to the N electrical energy units;

constructing N switch circuits corresponding to the N electrical energy units, each switch circuit including a plurality of electronic switches operable to couple a respective electrical energy unit to a respective winding in a discharging configuration, or to couple the respective electrical energy unit to the respective winding in a charging configuration, or to uncouple the respective electrical energy unit from the respective winding in an idling configuration;

constructing N driver circuits, being respectively coupled to the N switch circuits, each driver circuit being operable to turn ON/OFF electronic switches of a respective switch circuit; and constructing a controller circuit, being coupled to the N driver circuits, to start a balancing process, operable to select each electrical energy unit for charging or discharging or idling, totaling X (where X≥1) unit(s) selected for discharging and Y (where Y≥1) unit(s) selected for charging and Z (where Z≥0) unit(s) selected for idling, operable to maintain the Z selected-for-idling electrical energy unit(s) uncoupled from Z respective winding(s) during the balancing process, operable to control simultaneously coupling the X selected-for-discharging electrical energy unit(s) to X respective winding(s) in discharging configuration(s) for a first period of time (adjustable) to simultaneously energize the X respective winding(s) to store some energy in the magnetic core, then immediately or after a short delay (adjustable), operable to control simultaneously coupling the Y selected-for-charging electrical energy unit(s) to Y respective winding(s) in charging configuration(s) for a second period of time (adjustable) to be charged with respective current(s) induced from the stored energy in the magnetic core, and operable to repeat the preceding discharging-then-charging cycle if more charge needs to be transferred from the X selected-for-discharging electrical energy unit(s) to the Y selected-for-charging electrical energy unit(s).

* * * * *